United States Patent [19]

Okubo

[11] Patent Number: 5,286,098
[45] Date of Patent: Feb. 15, 1994

[54] ANTI-LOCK CONTROL METHOD FOR PREVENTING VEHICLE YAWING

[75] Inventor: Satomi Okubo, Saitama, Japan

[73] Assignee: Akebono Brake Industry Co., Ltd., Tokyo, Japan

[21] Appl. No.: 911,616

[22] Filed: Jul. 10, 1992

[30] Foreign Application Priority Data

Jul. 12, 1991 [JP] Japan .................... 3-197452

[51] Int. Cl.$^5$ ............................... B60T 8/58
[52] U.S. Cl. ..................... 303/100; 303/103; 303/DIG. 4; 364/426.02
[58] Field of Search ............... 303/100, 103, 104, 105, 303/107, 109, 111, 94, 96, DIG. 4; 364/426.02

[56] References Cited

U.S. PATENT DOCUMENTS

| | | | |
|---|---|---|---|
| 3,433,536 | 3/1969 | Skinner | 303/DIG. 4 X |
| 3,718,374 | 2/1973 | Ochia | 303/DIG. 4 X |
| 3,762,775 | 10/1973 | Ochiai | 303/DIG. 4 X |
| 3,893,330 | 7/1975 | Shute et al. | 303/100 X |
| 4,349,876 | 9/1982 | Lindemann | 303/111 X |
| 4,489,382 | 12/1984 | Jonner et al. | 303/103 X |
| 4,664,453 | 5/1987 | Kade et al. | 303/DIG. 4 X |
| 4,807,133 | 2/1989 | Shimanuki et al. | 303/105 X |
| 4,900,099 | 2/1990 | Braschel | 303/DIG. 4 X |
| 4,984,164 | 1/1991 | Maehara et al. | 303/103 |
| 5,028,095 | 7/1991 | Okubo | 303/109 X |
| 5,063,514 | 11/1991 | Headley et al. | 303/111 X |
| 5,123,715 | 6/1992 | Okubo | 303/105 X |

Primary Examiner—Robert J. Oberleitner
Assistant Examiner—Peter M. Poon
Attorney, Agent, or Firm—Cushman, Darby & Cushman

[57] ABSTRACT

An anti-lock control method for preventing a vehicle from yawing during braking, while driving on a split road surface. The amounts of the pressure increase in a right wheel and a left wheel control system, controlled independently of each other, are compared with each other. When there is a difference between the two pressure increase amounts, it is determined that the control system having the greater pressure increase amount is the high road-side control system whereas the other control system, having the smaller pressure increase amount, is the low road-side control system. The brake hydraulic pressure in the high road-side control system is controlled so that it does not excessively increase.

3 Claims, 7 Drawing Sheets

REDUCTION OF SLOPE OF Vr

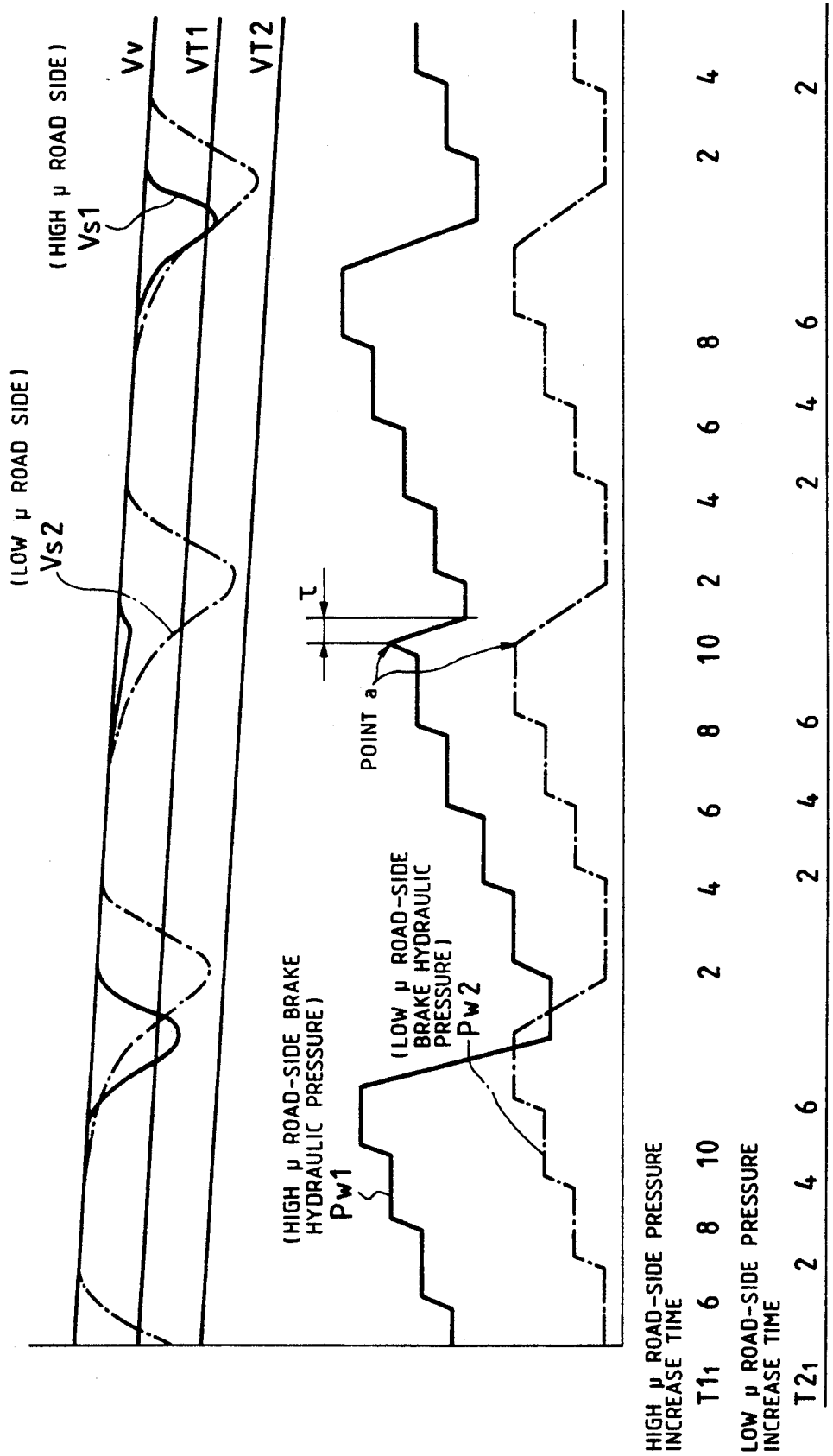

ANTI-LOCK CONTROL METHOD FOR PREVENTING VEHICLE YAWING

BACKGROUND OF THE INVENTION

1. Field of the Invention

The present invention relates to an anti-lock control method for preventing wheels of a vehicle from locking during braking, and more particularly, to an anti-lock control method for preventing the wheels from yawing during braking in the situation where either the right wheel or the left wheel runs on a high road surface and the other wheel runs on a low road surface.

2. Discussion of the Prior Art

Generally, for the purpose of maintaining good steering capability and vehicle stability while braking a vehicle, and also of reducing the braking distance, an anti-lock control device is used. Conventionally, the device includes a control unit having a microcomputer, where the control mode of the brake hydraulic pressure is determined according to electrical signals representing wheel speeds detected by wheel speed sensors. Hold valves (normally-opened solenoid valves) and decay valves (normally-closed solenoid valves) are opened and closed to increase, decrease or hold the brake hydraulic pressure.

In such a conventional anti-lock control method, a pressure decrease reference speed Vr is set based on a wheel speed to be controlled (hereinafter referred to as "system speed Vs") in each brake control system. A speed, which has a predetermined acceleration/deceleration following limit with respect to the highest one of the four wheel speeds, is set as an estimated vehicle speed Vv. There is also set a threshold speed VT which, while kept lower in speed a predetermined value than the estimated vehicle speed Vv, follows this estimated vehicle speed. In accordance with the comparison of the system speed Vs with the reference speed Vr or the threshold speed VT to determine which of them is higher, and also in accordance with detected high and low peak points of the system speed Vs, the time of starting each control mode (i.e. increasing, decreasing or holding the brake pressure), as well as the time of ending each control mode, are set. A plurality of hydraulic control valves (solenoid valves) are turned on and off in accordance with predetermined control procedures set respectively for these control modes, thereby increasing, holding and decreasing the pressure.

For example, a pair of control systems are set in such a manner that the wheel speeds of the right and left front wheels are represented by system speeds Vs1 and Vs2, respectively, and their anti-lock controls are independent of each other. In such an anti-lock control method, there is a condition when the pressure increases with respect to the right and left control systems, using the same mode judgment standard when the vehicle is running on a split road surface (i.e. a right wheel is on a high road surface and a left wheel is on a low road surface, or vice versa), in which the road surface friction coefficients μ (hereinafter referred to as "road surface μ") to which the right and left wheels are subjected are different from each other. Thus, in the control system in which the front wheel is on the high road surface, the brake hydraulic pressure is controlled such that a sufficient braking force can be obtained utilizing this high μ road surface. Whereas in the control system in which the other front wheel is on the low road surface, the brake hydraulic pressure is controlled such that the braking force is decreased to prevent a wheel from locking. The amount of pressure increase required for one cycle of acceleration and deceleration of the wheel is much larger than the low road-side control system. Therefore, a yawing moment develops in the vehicle body, which affects the vehicles stability.

SUMMARY OF THE INVENTION

It is therefore an object of this invention to provide an anti-lock control method which prevents the occurrence of a yawing moment while braking a vehicle on a split road surface, thereby improving stability.

According to the anti-lock control method of the present invention, the amounts of pressure increase in a pair of right and left control systems are determined independently of each other and are compared with each other. When there is a difference between the two pressure increase amounts, it is determined that the control system having the greater pressure increase amount is the high road-side control system and the other control system, having the smaller pressure increase amount, is the low road-side control system. The brake hydraulic pressure in the high road-side control system is controlled so that it does not excessively increase. A preset condition for decreasing the brake hydraulic pressure in the high road-side control system is changed so that the pressure decrease starting point begins earlier.

In addition, in synchronism with the starting of the decrease in the brake hydraulic pressure in the low road-side control system, the brake hydraulic pressure which is increased in the high road-side control system is decreased for a predetermined time period, thereby preventing an excessive increase in the brake hydraulic pressure in the high road-side control system.

BRIEF DESCRIPTION OF THE DRAWINGS

FIG. 8 is a timing chart for explaining a second embodiment of the invention.

DETAILED DESCRIPTION OF THE PREFERRED EMBODIMENTS

Figure 1:
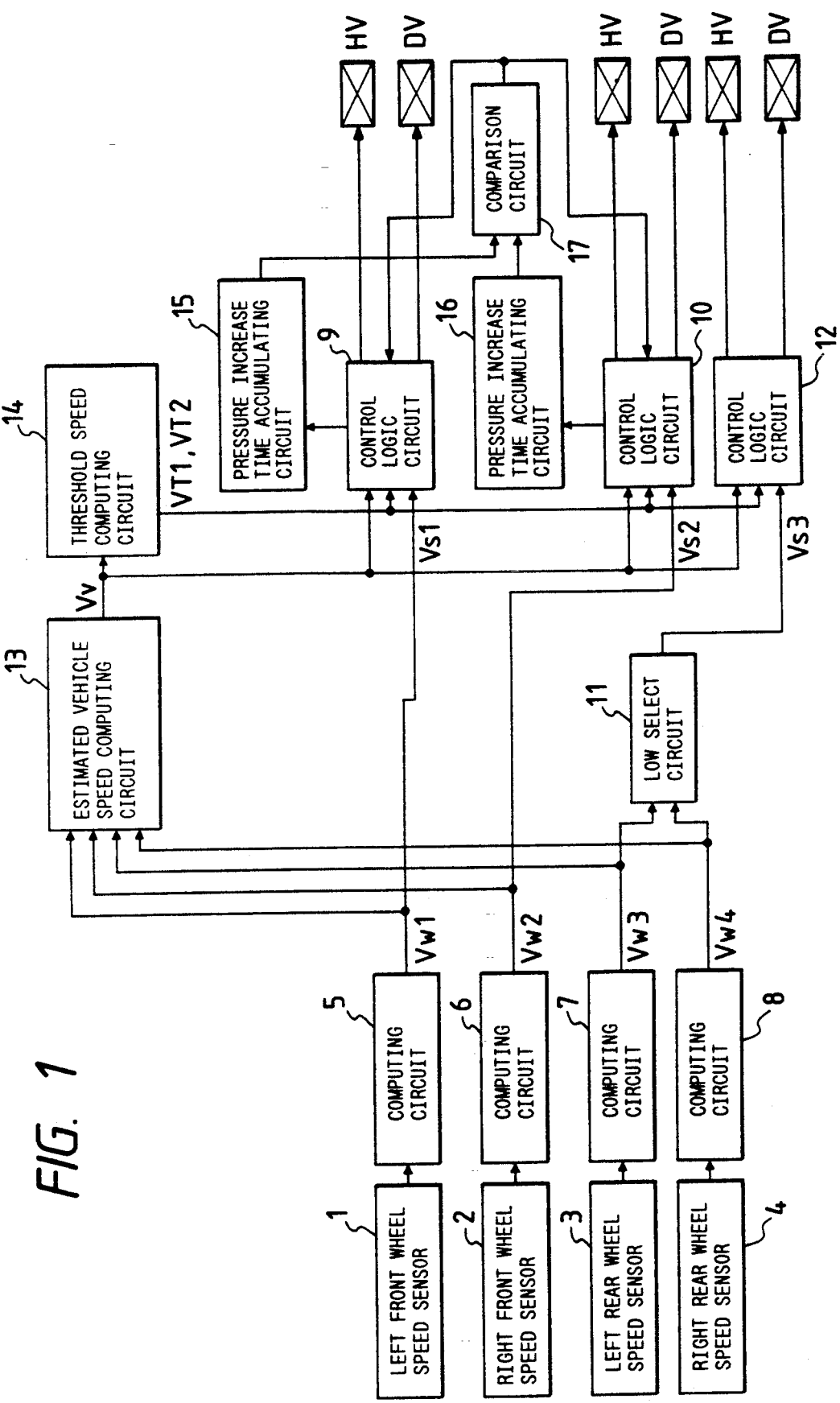
FIG. 1 is a block diagram of a 3-channel anti-lock control device according to the present invention.

FIG. 1 is a block diagram of a 3-system (3-channel) anti-lock control device according to the present invention. Outputs of wheel speed sensors 1 to 4 are fed to computing circuits 5 to 8, respectively, in which signals representing wheel speeds Vw1 to Vw4 are computed. The signals representing left front wheel speed Vw1 and right front wheel speed Vw2 are used as signals representing a first-channel system speed Vs1 and a second-channel system speed Vs2, respectively, and are fed to first and second control logic circuits 9 and 10, respectively. One of the signals representing the left rear wheel speed Vw3 and the right rear wheel speed Vw4 which is lower in speed is selected by a low select circuit 11, and is used as a signal representing a third-channel system speed Vs3, and is fed to a third control logic circuit 12. The control logic circuits 9, 10 and 12 use the system speeds Vs1, Vs2 and Vs3 as wheel speeds to be controlled. In accordance with the changes of these system speeds, hold valves HV (normally-opened solenoid valves) and decay valves DV (normally-closed solenoid valves) are controlled. That is, they are turned on and off in order to increase, decrease or hold the brake hydraulic pressure.

The signals representing the wheel speeds Vw1 to Vw4 are fed to an estimated vehicle speed computing circuit 13. This computing circuit 13 computes a speed limited to ±1G, with respect to the highest one of the four wheel speeds Vw1 to Vw4. This speed is used as an estimated vehicle speed Vv approximating an actual vehicle speed, and the computing circuit 13 outputs a signal, representing the estimated vehicle speed Vv, to the control logic circuits 9, 10 and 12.

The signal representing the estimated vehicle speed Vv obtained in the computing circuit 13 is also fed to a threshold speed computing circuit 14. This computing circuit 14 computes a first threshold speed VT1 and a second threshold speed VT2 which follow the estimated vehicle speed Vv with constant speed differences (i.e. Vv>VT1>VT2). The output of the threshold speed computing circuit 14 is fed to the control logic circuits 9, 10 and 12.

In connection with the first and second control logic circuits 9 and 10, pressure increase time-accumulating circuits 15 and 16 and a comparator circuit 17 are provided. Each of the pressure increase time-accumulating circuits 15 and 16 has the function of accumulating the time of the OFF-state of the hold valve HV in its own channel (i.e., the first or the second channel). That is, they accumulate the pressure increase time. The comparator circuit 17 compares the pressure increase times accumulated in the pressure increase time-accumulating circuits 15 and 16, and outputs this comparison result to the control logic circuits 9 and 10.

Figure 2:
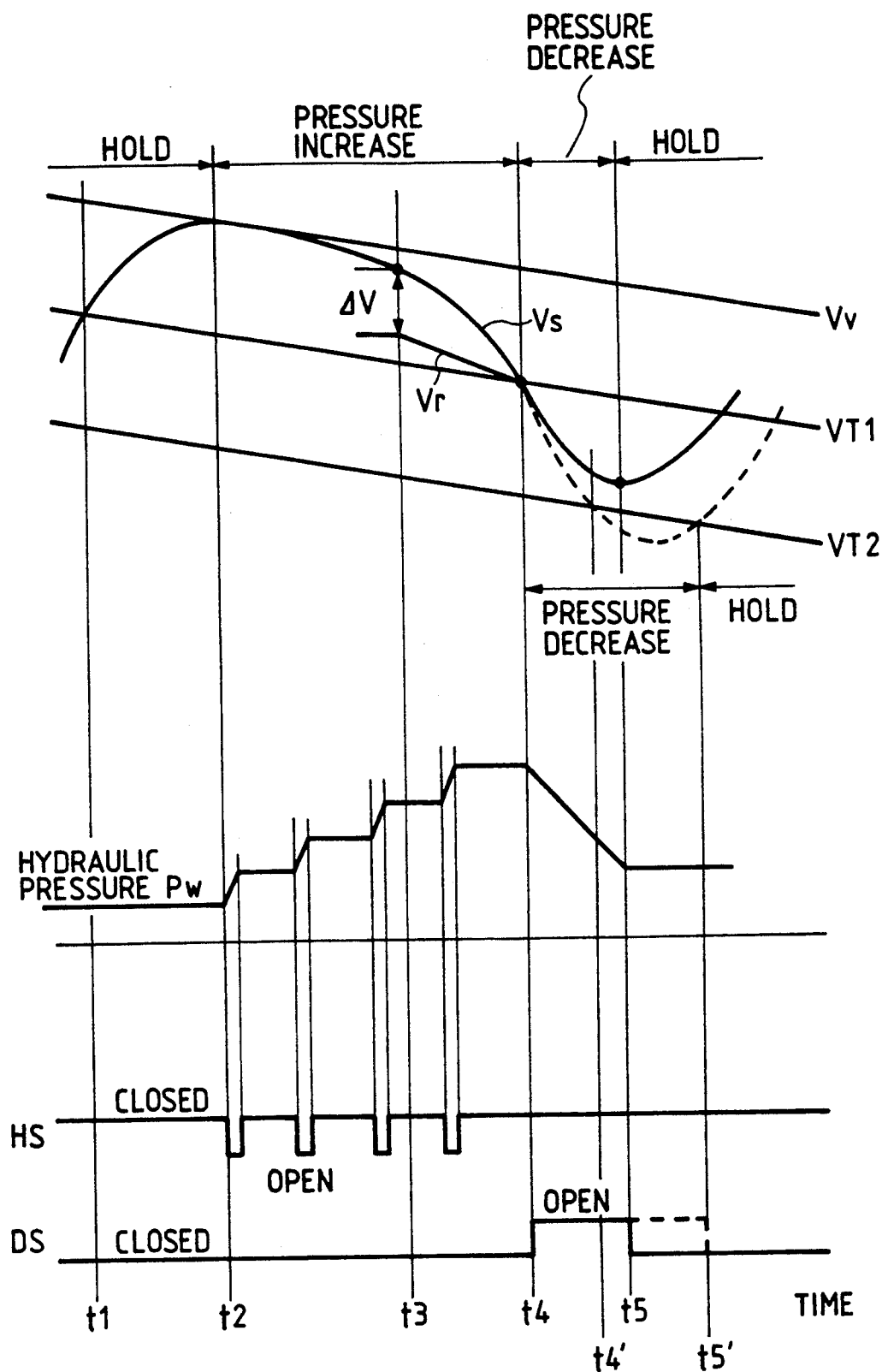
FIG. 2 is a timing chart of one example of an anti-lock control method according to the present invention.

FIG. 2 shows the system speed Vs, recovered by the pressure decrease in the preceding control cycle, exceeds the first threshold speed VT1 at a time point t1, and then reaches the high peak at a time point t2. At this time point t2, the control is switched from the hold mode to the pressure increase mode, and the hold signal HS is switched between the ON state and the OFF state at short intervals to repeat the opening and closing of the hold valve HV, so that the brake hydraulic pressure Pw increases stepwise. The deceleration of the system speed Vs which has begun to decrease by this pressure increase reaches a predetermined value (for example, −1G) at a time point t3, and there is set the reference speed Vr which linearly decreases with a slope of the above predetermined deceleration (−1G). Vr has a starting point which is lower a predetermined value ΔV than the system speed Vs at the time point t3.

Then, the decay signal DS goes to the ON state at an earlier one of two time points. That is, at the time point when the system speed Vs goes below the reference speed Vr and the time point when the system speed Vs goes below the first threshold speed VT1, the decay valve DV is opened to start the pressure decrease mode. In FIG. 2, the pressure decrease mode begins from a time point t4 at which the system speed Vs goes below the first threshold speed VT1. Then, if the low peak point of the system speed Vs is between the two threshold speeds VT1 and VT2 as indicated by a solid line in FIG. 2, the pressure decrease mode is finished at a time point t5 at which the above low peak point is obtained, and the hold mode begins therefrom. However, if the system speed Vs goes below the second threshold speed VT2 at a time point t4', the pressure decrease mode continues up to a time point t5', that is, until the system speed Vs is recovered to the second threshold speed VT2, as indicated by a broken line in FIG. 2.

Figure 3:
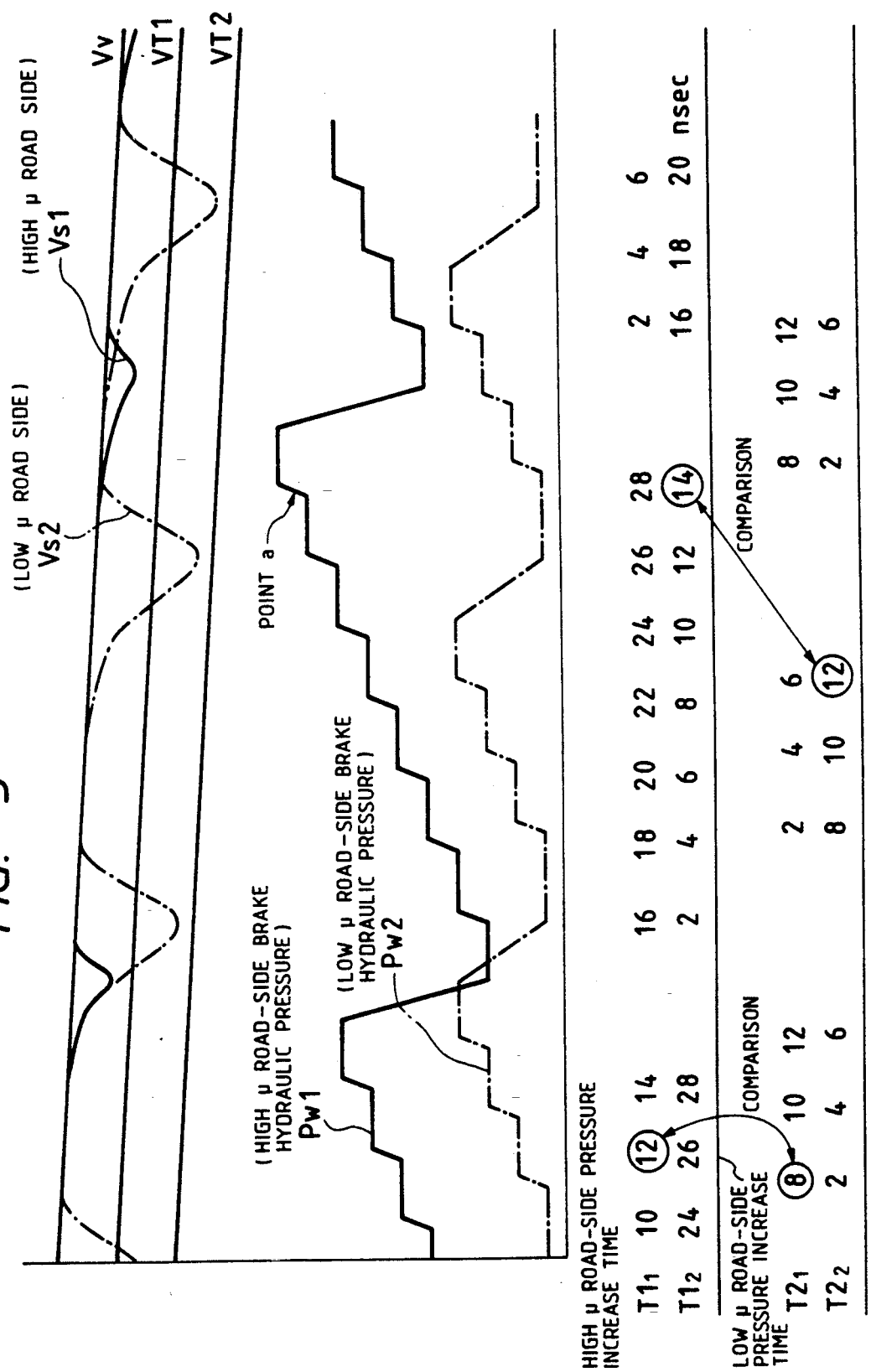
FIG. 3 is a timing chart for explaining a first embodiment of the present invention.

FIG. 3 is a timing chart showing a first embodiment of the anti-lock control method of the present invention. In FIG. 3, the front wheel speed for the high road is represented by the first control speed Vs1, and the front wheel speed for the low μ road is represented by the second control speed Vs2. There are large differences in the pressure increase amount and the control cycle between the brake hydraulic pressure Pw1 for the high road-side control system and the brake hydraulic pressure Pw2 for the low road-side control system. The pressure increase times T1 and T2 during two cycles of the anti-lock control in the two control systems are accumulated by the pressure increase time-accumulating circuits 15 and 16 (FIG. 1), respectively, and the accumulation results (unit: nsec) thereof are shown in FIG. 3.

As is clear from FIG. 3, the pressure increase times of the two control systems during two cycles are accumulated in such a manner that they are shifted one cycle from each other. The results of accumulation of the pressure increase times during one cycle and during two cycles can always be detected simultaneously. The accumulated pressure increase time for the high road during one cycle is compared with the accumulated pressure increase time for the low road during two cycles, using the comparator circuit 17 (FIG. 1). At a time point (indicated by point a in FIG. 3) at which the accumulated pressure increase time for the high road during one cycle becomes greater than the accumulated pressure increase time for the low road during two cycles, it is determined that the difference between the pressure increase amounts of the right and left wheels exceeds a predetermined value due to the split road, so that the control for the front wheel on the high road is reduced. Thus, the set value is changed so that an excessive increase of the brake hydraulic pressure is prevented so as to reduce the rate of utilization of the road by the high side front wheel, thereby preventing the generation of a yawing moment.

Figure 5:
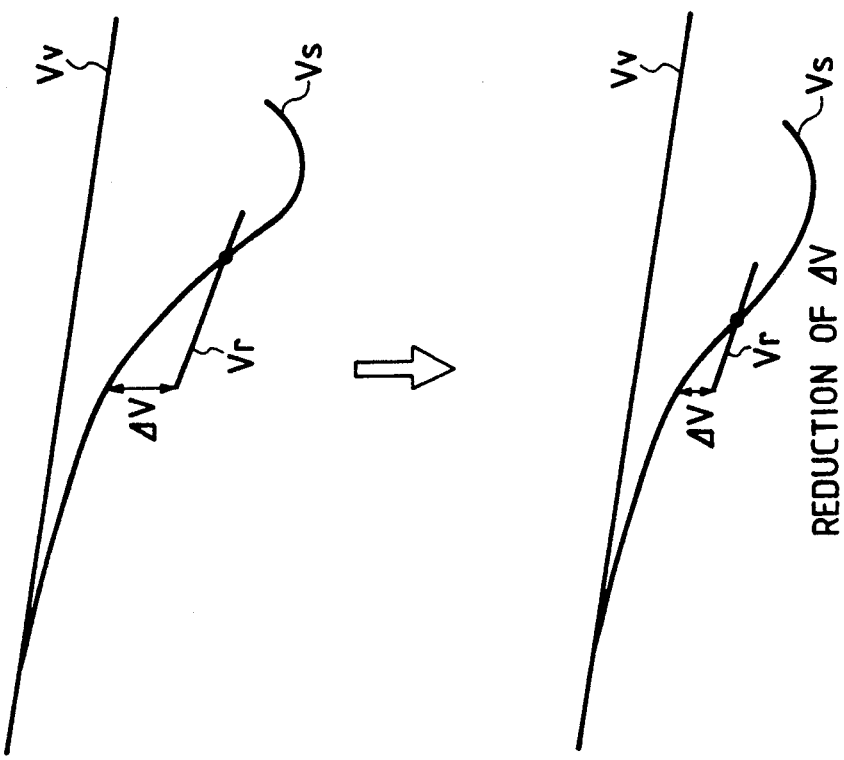
FIG. 5 is an illustration showing another example of changing the set value in FIG. 3.
Figure 4:
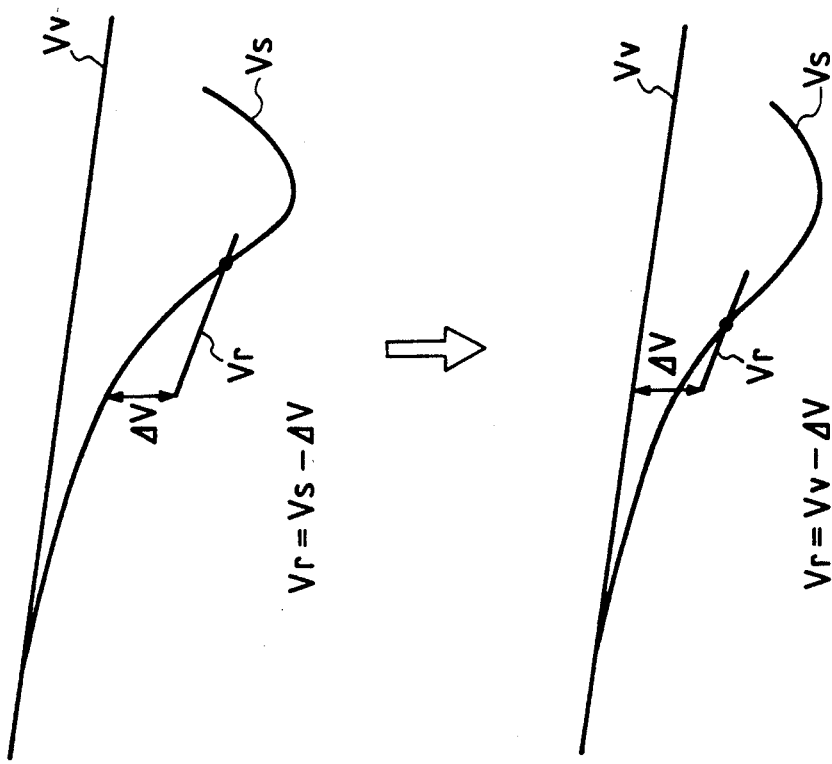
FIG. 4 is an illustration showing one example of changing a set value in FIG. 3.
Figure 6:
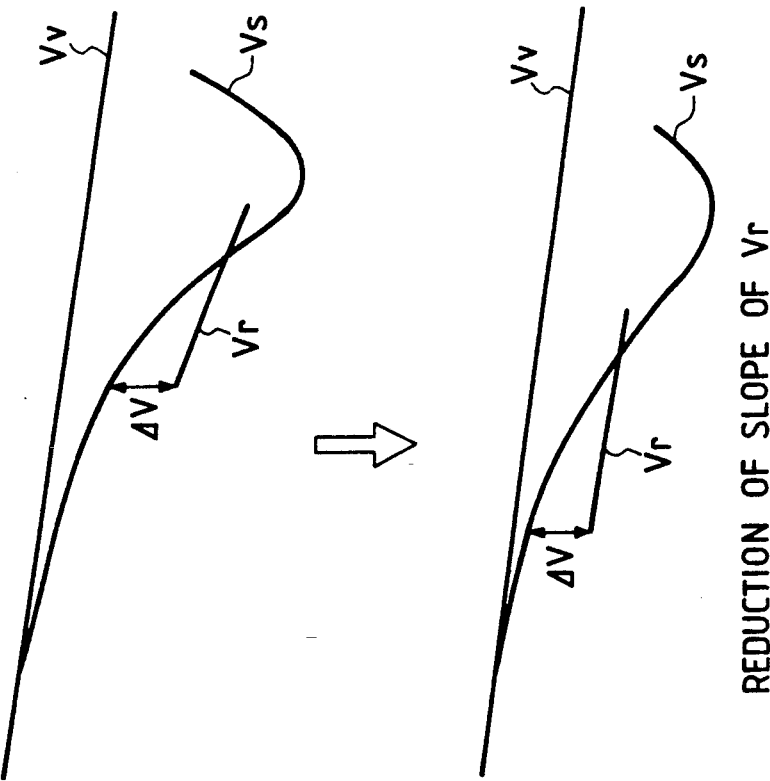
FIG. 6 is an illustration showing a further example of changing the set value in FIG. 3.

This change of the set value is achieved, for example, by setting the starting point of the reference speed Vr to a speed (Vv−ΔV) lower ΔV than the estimated vehicle speed Vv, as shown in FIG. 4. So far, the starting point of the reference speed Vr at the time point t3 (FIG. 2) has been set to the speed (Vs−ΔV) lower ΔV than the system speed Vs. Alternatively, the value of ΔV may be made smaller as shown in FIG. 5. Also, as shown in FIG. 6, so that the point of generation of the reference speed Vr can be earlier, the value of the deceleration of the system speed Vs at the time of generation of the reference speed Vr may be made smaller so as to make the slope or gradient of the reference speed Vr gentler. For example, this value is changed from −1G to −0.5G. With any of these changes, the time for starting the pressure decrease in the high road-side control system can be made earlier than usual, and by doing so, an excessive increase of the brake hydraulic pressure in the high road-side control system can be restrained.

Figure 7:
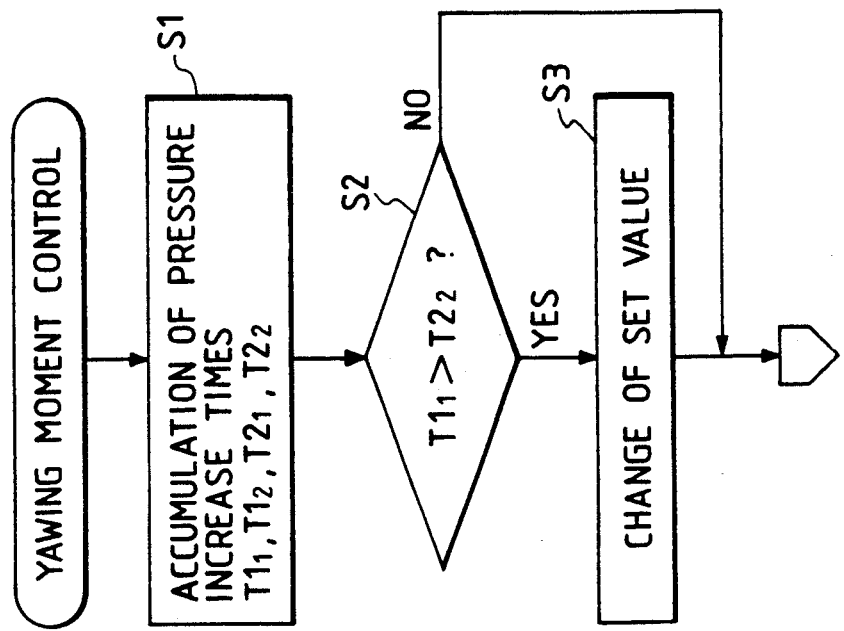
FIG. 7 is a flow chart describing the prevention of a yawing moment according to the first embodiment of the invention.

FIG. 7 shows a flow chart for the yawing moment generation prevention control of the first embodiment of the present invention. First, in Step S1, the pressure increase times for the two control systems during one cycle and two cycles are accumulated ($T1_1$, $T1_2$, $T2_1$, $T2_2$), as shown in FIG. 3. Then, in Step S2, the accumulated pressure increase time $T1_1$ for the high road side system for the first cycle is compared with the accumulated pressure increase time $T2_2$ for the low road side system for the second cycle. If the result is $T1_1 > T2_2$, the set value is changed in the high $\mu$ road side system at Step S3 in the manner shown in FIGS. 4 to 6, thereby making the pressure decrease-starting point earlier.

FIG. 8 is a timing chart of a second embodiment of an anti-lock control method of the present invention. In this embodiment, unlike the first embodiment, only the pressure increase time during one cycle for each of the two control systems is accumulated. If when the pressure decrease-starting point is reached in one of the control systems, the other control system is in the pressure increase mode, and also if as compared with the accumulated pressure increase time $T2_1$ for one system during one cycle, the accumulated pressure increase time $T1_1$ for the other system during one cycle is greater (the point a in FIG. 8), the brake hydraulic pressure in the other system (the high $\mu$ road side) is reduced for a predetermined time period $\tau$, thereby preventing the brake hydraulic pressure of the high $\mu$ road side from increasing too abruptly.

Figure 9:
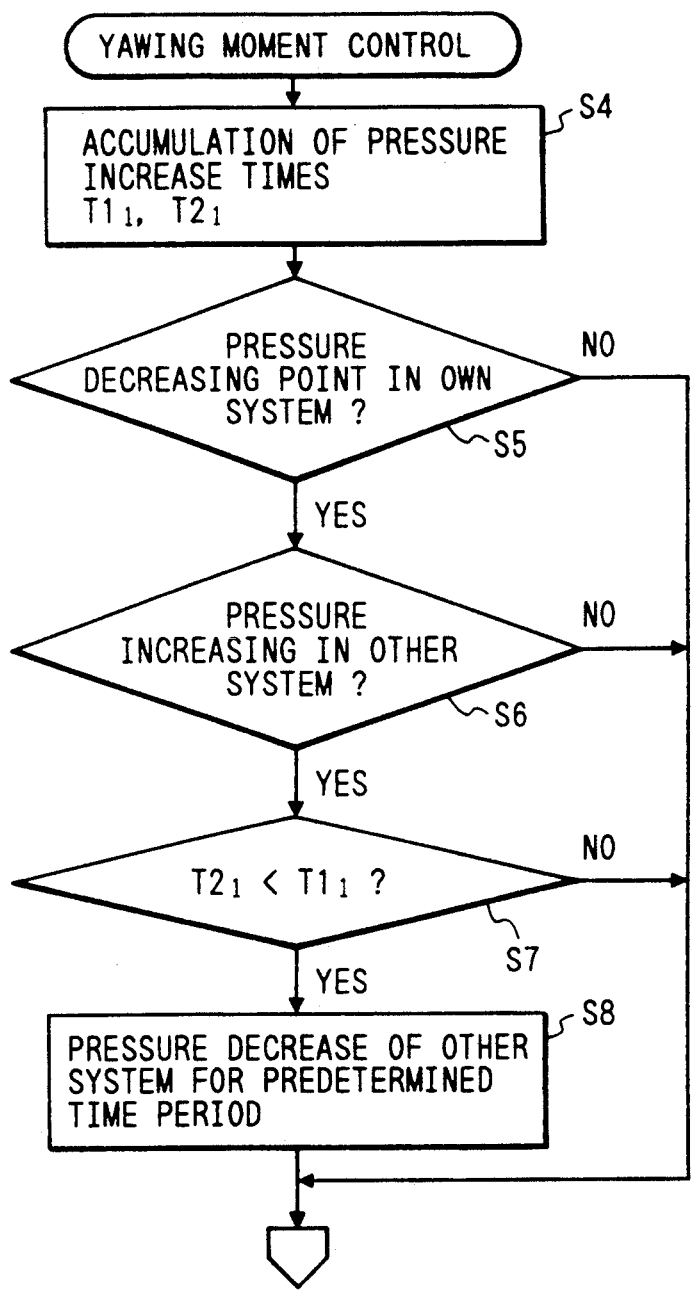
FIG. 9 is a flow chart describing the prevention of a yawing moment according to the second embodiment of the invention.

FIG. 9 is a flow chart for the yawing moment generation prevention control according to the second embodiment of the present invention. Namely, in FIG. 9, first, in Step S4, the pressure increase times for the two control systems during one cycle are accumulated ($T1_1$, $T2_1$) as shown in FIG. 7. In the next Step S5, it is judged whether or not the pressure decrease-starting point is reached in its own system. If this judgment result is "YES", it is judged in Step S6 whether or not the other system is in the pressure increase mode. If this judgment result is "YES", the pressure increase time $T2_1$ for its own system during one cycle is compared with the pressure increase time $T1_1$ for the other system during one cycle in Step S7. If $T2_1 < T1_1$ is obtained, the other system (the high road side in this case) is subjected to a pressure decrease for a predetermined time period $\tau$, thereby preventing an abrupt increase of the brake hydraulic pressure for the high road.

In the present invention, from the difference between the pressure increase amounts of the right and left wheels, it is judged that the road is a split road. In the first embodiment, the control for the wheel having the greater pressure increase amount is reduced, thereby reducing the rate of utilization of the road surface by the high road-side wheel, so that the generation of the yawing moment is restrained. In the second embodiment, the brake hydraulic pressure for the wheel having the greater pressure increase amount is gently increased to such a pressure as to lock the wheel, thereby making the utilization of the road surface by the high road-side wheel smooth, so that the generation of the yawing moment is restrained, and the running stability of the vehicle is improved. On the other hand, since the high road surface can be utilized suitably, there is no risk that the braking force will be lost.

It should be understood that the foregoing relates to preferred embodiments of the invention, and that it is intended to cover all changes and modifications of the embodiments of the invention herein which do not constitute departures from the spirit and scope of the invention.

What is claimed is:

1. An anti-lock control method for preventing a vehicle from yawing when braking on a split-road surface, the vehicle including:
   sensors for sensing a wheel speed for each wheel; and
   two independent control devices for controlling a right wheel speed and a left wheel speed, respectively, based upon said wheel speed sensed by said sensors during braking, by increasing, decreasing or holding constant a brake hydraulic pressure, said method comprising the steps of:
   measuring an amount of brake hydraulic pressure increase in each said control device when said vehicle is braked;
   comparing said amount of brake hydraulic pressure increase in each said control device;
   determining, when a difference in said brake hydraulic pressure increase amounts exists, that said control device having a greater pressure increase amount is a high road-side control system and said control device having a smaller pressure increase amount is a low road-side control system; and
   controlling said brake hydraulic pressure in said high road-side control system so that it does not excessively increase.

2. An anti-lock control method according to claim 1, wherein in said controlling step, a predetermined condition for decreasing said brake hydraulic pressure in said high road-side control device is changed so that decreasing said brake hydraulic pressure begins earlier than it would without changing said predetermined condition.

3. An anti-lock control method according to claim 1, wherein in said controlling step, when said brake hydraulic pressure in said low road-side control system begins to decrease, said brake hydraulic pressure which has increased in said high road-side control system is decreased for a predetermined time period.

* * * * *